US007381893B2

United States Patent
Kerr, Jr.

(10) Patent No.: US 7,381,893 B2
(45) Date of Patent: Jun. 3, 2008

(54) FASTENING DEVICE FOR MOUNTING AN ELECTRICAL FIXTURE

(75) Inventor: Jack Russell Kerr, Jr., College Station, TX (US)

(73) Assignee: Angelo Fan Brace Licensing LLC, Philadelphia, PA (US)

( * ) Notice: Subject to any disclaimer, the term of this patent is extended or adjusted under 35 U.S.C. 154(b) by 0 days.

(21) Appl. No.: 11/723,527

(22) Filed: Mar. 20, 2007

(65) Prior Publication Data

US 2007/0215372 A1  Sep. 20, 2007

Related U.S. Application Data

(60) Provisional application No. 60/783,410, filed on Mar. 20, 2006.

(51) Int. Cl.
*H01H 9/02* (2006.01)
(52) U.S. Cl. .............................. 174/58; 174/50; 174/53; 174/57; 220/3.2; 220/3.3; 248/906
(58) Field of Classification Search .................. 174/50, 174/53, 57, 58, 135, 61, 62, 63, 54, 480, 174/481; 220/3.2, 3.3, 3.7, 3.8, 3.9; 248/906, 248/343, 200.1, 57, 544, 27.1, 300, 342; 200/297, 296
See application file for complete search history.

(56) References Cited

U.S. PATENT DOCUMENTS 2,316,389 A * 4/1943 Atkinson ................. 248/200.1
3,214,126 A * 10/1965 Roos ........................... 220/3.9
3,518,421 A * 6/1970 Cogdill ......................... 248/57
5,024,412 A * 6/1991 Hung et al. ................. 248/343
5,044,582 A * 9/1991 Walters ...................... 248/343
5,938,157 A * 8/1999 Reiker ........................ 248/343
5,954,304 A * 9/1999 Jorgensen ................... 248/343
6,098,945 A * 8/2000 Korcz ......................... 248/343
6,237,884 B1 * 5/2001 Howe ......................... 248/343
6,768,071 B1 * 7/2004 Gretz .......................... 174/50
6,889,943 B2 * 5/2005 Dinh et al. .................. 248/343
6,967,284 B1 * 11/2005 Gretz .......................... 174/58
7,148,420 B1 * 12/2006 Johnson et al. ............... 174/58
7,216,838 B1 * 5/2007 Gretz ...................... 248/200.1

* cited by examiner

*Primary Examiner*—Angel R. Estrada
(74) *Attorney, Agent, or Firm*—Blank Rome LLP

(57) ABSTRACT

A fastening device for mounting an electrical fixture suspended from an electrical junction box in a ceiling. When a mounting bracket assembly suspends the electrical junction box between two joists, the fastening device is an overlay positioned adjacent to each end-plate of the support bar. When the electrical junction box attaches directly to a joist, the fastening device is an overlay positioned inside a cavity of the electrical junction box. The overlay includes fastener openings that position a preset fastener to attach the end-plates to the spaced joists, or openings in the top wall of the cavity to attach the electrical junction box to a joist in the ceiling. The overlay also includes radial incisions, cut in a star pattern, that surround each fastener opening. When an installer tightens all of the fasteners, the star patterns open and allow the installer to easily pull-out and remove the overlay.

15 Claims, 7 Drawing Sheets

FASTENING DEVICE FOR MOUNTING AN ELECTRICAL FIXTURE

CROSS-REFERENCE TO A RELATED APPLICATION

This application for letters patent is related to and incorporates by reference provisional application for patent Ser. No. 60/783,410, titled "Fastening Device for Mounting an Electrical Fixture" and filed in the United States Patent and Trademark Office on Mar. 20, 2006.

BACKGROUND OF THE INVENTION

1. Field of the Invention

This invention relates to a fastening device for mounting an electrical fixture. In particular, the invention is a fastening device for mounting an electrical fixture in a ceiling area.

2. Description of the Prior Art

An electrical junction box provides a safe enclosure for the electrical wiring that powers an electrical fixture. For an electrical fixture hanging from a ceiling, such as a ceiling fan or light fixture, the electrical junction box typically spans between two spaced beams, joists, studs, or the like. A mounting bracket assembly provides the support necessary to suspend the electrical junction box between the two spaced beams, joists, studs, or the like. Alternatively, the electrical junction box attaches directly to a beam, joist, stud, cross-member, or the like. In this case, the electrical junction box alone provides the support necessary to suspend the electrical fixture from the ceiling.

The installation of the mounting bracket assembly to the two spaced beams, joists, studs, or the like and the installation of the electrical junction box directly to the beam, joist, stud, cross-member, or the like can be an awkward and cumbersome task, especially when performed by a single individual. Often, the installer must work atop a ladder and may not have both hands free to perform the installation task. A fastening device can improve the installation task by making the process easier, more convenient, and save time and expense.

Thus, there is a demand for a fastening device for a mounting bracket assembly and an electrical junction box that is capable of suspending an electrical fixture from a ceiling. The fastening device eases the installation task and allows a single individual to perform the installation on their own. The presently disclosed fastening device for mounting an electrical fixture satisfies these demands.

SUMMARY OF THE INVENTION

A fastening device for mounting an electrical fixture in a ceiling area. The electrical fixture attaches to an electrical junction box to mount the electrical fixture in the ceiling area. In one embodiment, a mounting bracket assembly provides the support necessary to suspend the electrical junction box between two-spaced joists. In another embodiment, the electrical junction box attaches directly to a joist.

The fastening device for a mounting bracket assembly comprises an electrical junction box, a support bar, a clamp component, and a pair of overlays. The support bar spans a distance between a pair of spaced joists and includes a pair of end-plates attached to the support bar. Each end-plate has a surface plane that is substantially perpendicular to a lateral axis of the support bar, and includes at least two openings that receive fasteners. The clamp component attaches the electrical junction box to the support bar. Each overlay is positioned along the support bar adjacent one of the end-plates and includes an opening that receives the support bar, and at least two preset fastener openings that position a preset fastener that passes through one of the openings in the end-plate to attach the end-plate to one of the spaced joists.

The fastening device for attaching an electrical junction box directly to a joist comprises an electrical junction box and an overlay. The electrical junction box includes at least two support members mounted inside a cavity of the electrical junction box that attach to a top wall of the cavity, and at least two openings in the top wall of the cavity. The overlay includes at least two guide openings for receiving the support members, and at least two preset fastener openings. Each preset fastener opening positions a preset fastener that passes through one of the openings in the top wall of the cavity to attach the electrical junction box to a joist in the ceiling area.

The overlay also includes a group of incisions that allow an installer to easily pull-out and remove the overlay after tightening all of the preset fasteners. The incisions surround each preset fastener opening. When an installer tightens the preset fastener, the incisions allow the overlay to open around each fastener. The incisions are cut into the overlay along a radius of the fastener opening to form of a star pattern around the fastener opening. When the installer tightens all of the fasteners, the overlay opens around the fastener opening and allows the installer to pull-out and remove the overlay.

DESCRIPTION OF THE INVENTION

FIGS. 1-8 illustrate an assembly for mounting an electrical fixture with an exemplary embodiment of a fastening device of the present invention.

Figure 1:
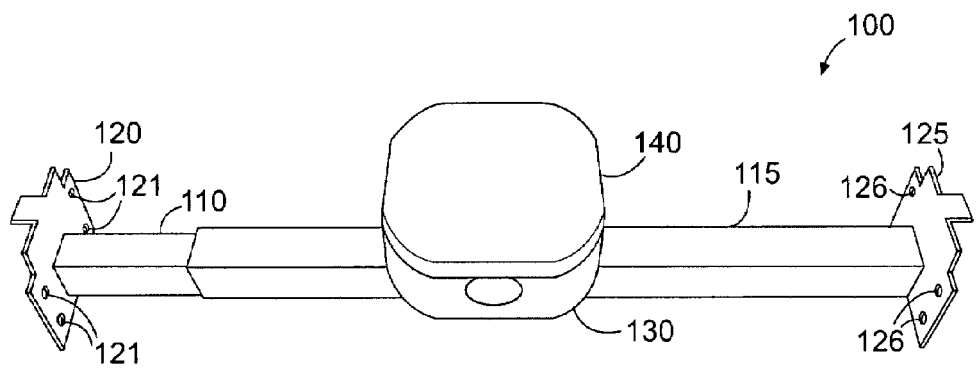
FIG. 1 is an isometric top-view of an assembly for mounting an electrical fixture with an exemplary embodiment of a fastening device of the present invention.

As shown in FIG. 1, the mounting bracket assembly 100 includes a telescoping tubular bar mechanism having an inner member 110 and an outer member 115, an end-plate 120 attached to the inner member 110, and an end-plate 125 attached to the outer member 115, a metal electrical junction box 130 attached to the telescoping tubular bar mechanism, and a plastic cover 140 over the electrical junction box 130. The end-plates 120, 125 include openings 121, 126 that receives fasteners to attach the end-plates 120, 125 to a joist or beam (not shown). The diameter of the inner member 110 is smaller than the diameter of the outer member 115 to allow the inner member 110 to slide inside the outer member 115, thereby producing the telescoping nature of the tubular bar mechanism. The attachment of the electrical junction box 130 to the telescoping tubular bar mechanism uses a prior art method, such as utilizing a metal strap that is bent around the telescoping tubular bar mechanism and attaches to the underside of the electrical junction box 130 with fasteners that protrude into the interior of the electrical junction box 130.

Figure 2:
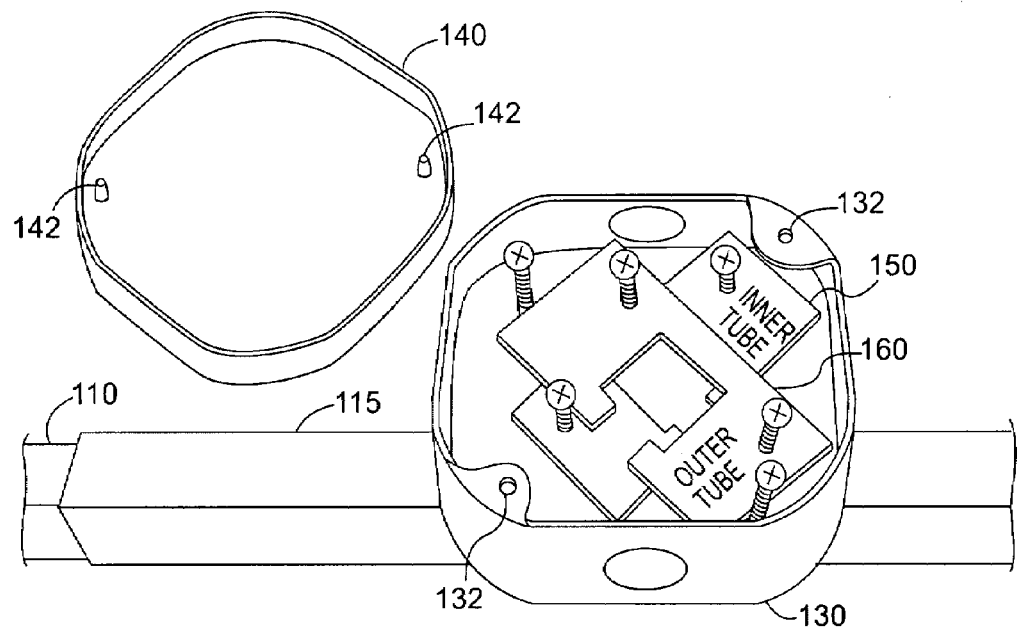
FIG. 2 is an exploded view of the assembly shown in FIG. 1.
Figure 3:
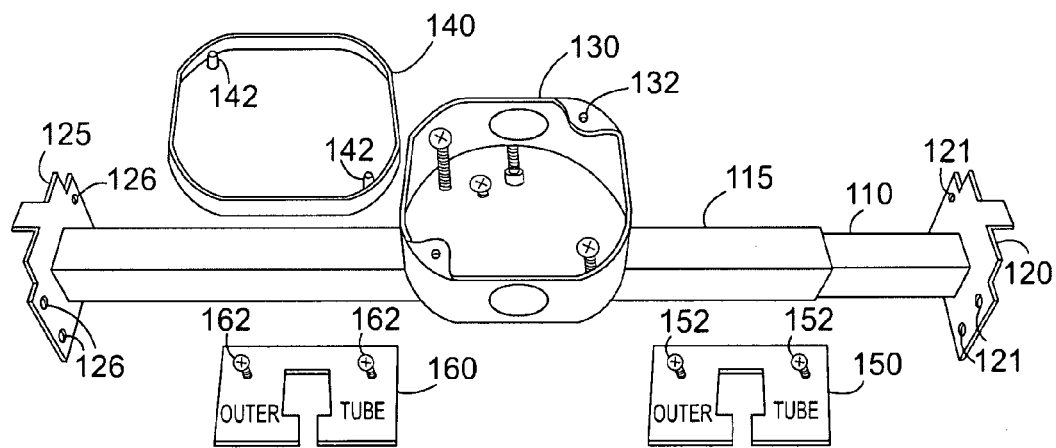
FIG. 3 is an exploded view of the assembly shown in FIG. 1.
Figure 4:
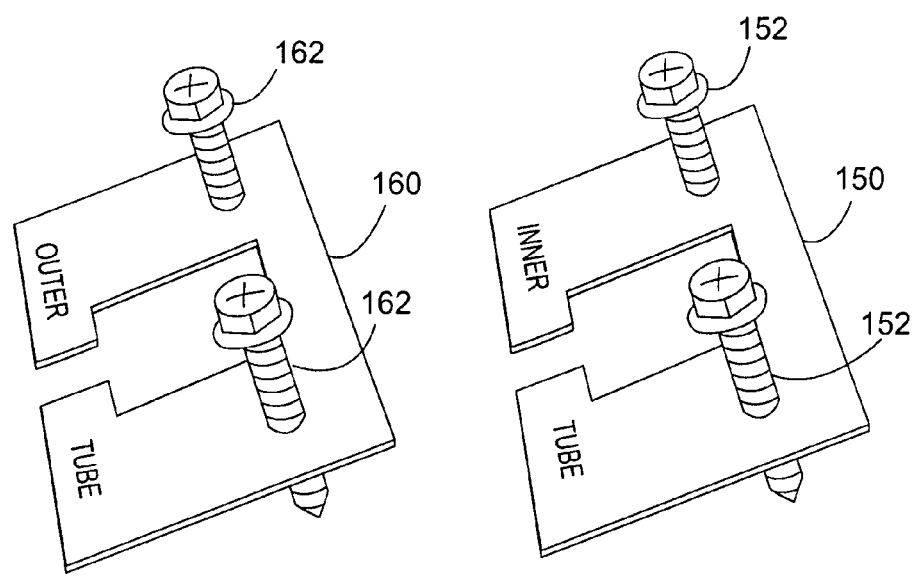
FIG. 4 is a side elevation of the fastening device shown in FIGS. 2 and 3.
Figure 5:
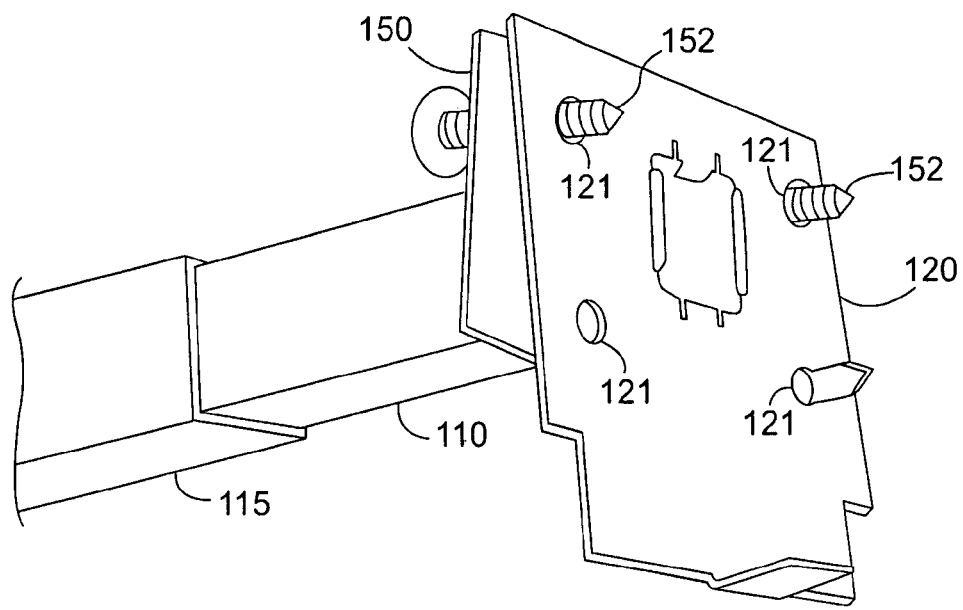
FIG. 5 is a rear elevation of the fastening device shown in FIGS. 2-4 installed on the assembly shown in FIG. 1.
Figure 6:
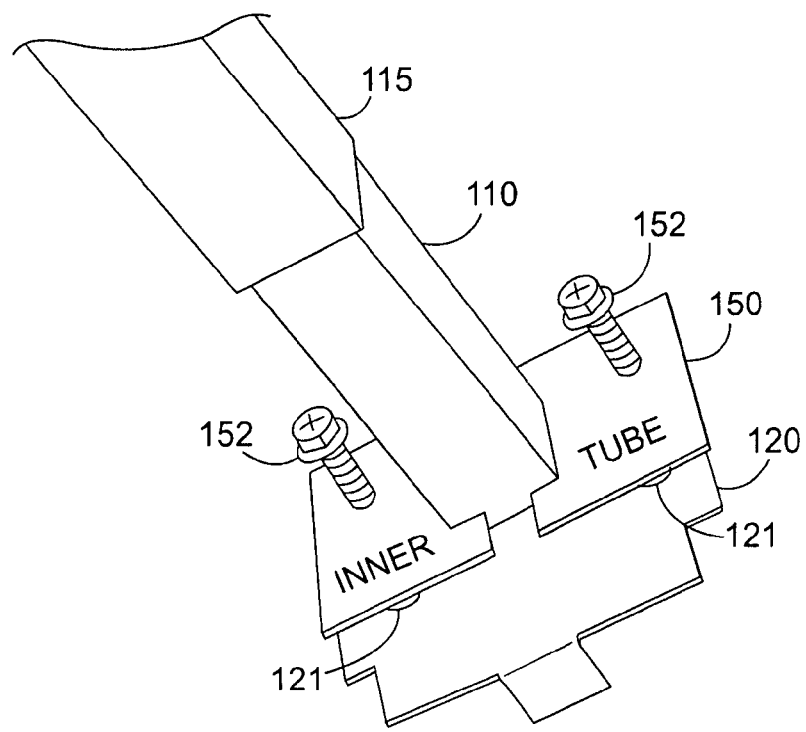
FIG. 6 is front elevation of the fastening device shown in FIGS. 2-4 installed on the assembly shown in FIG. 1.
Figure 7:
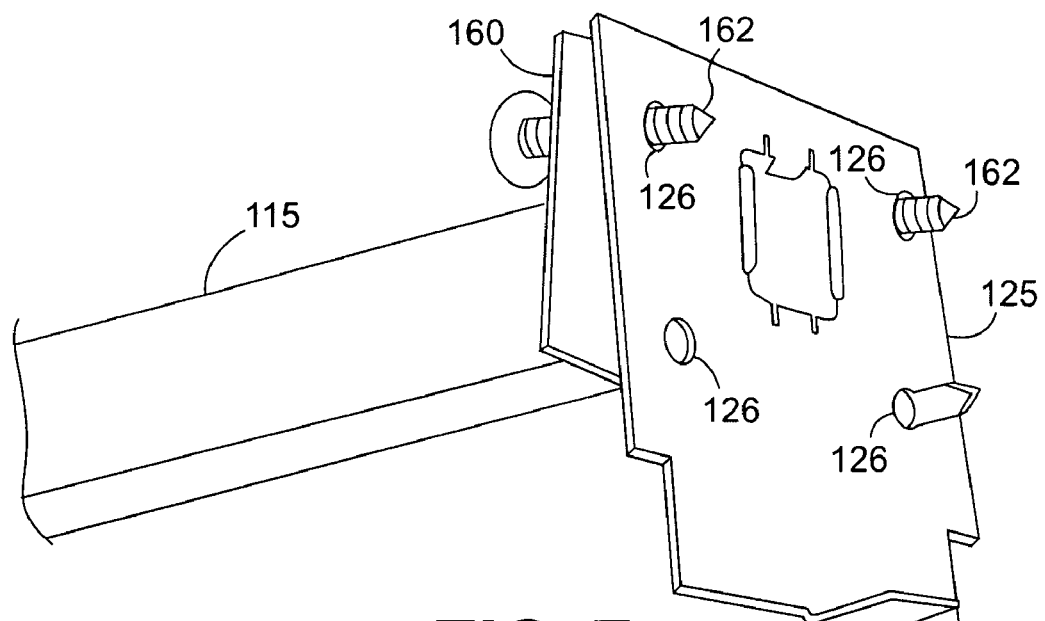
FIG. 7 is a rear elevation of the fastening device shown in FIGS. 2-4 installed on the assembly shown in FIG. 1.
Figure 8:
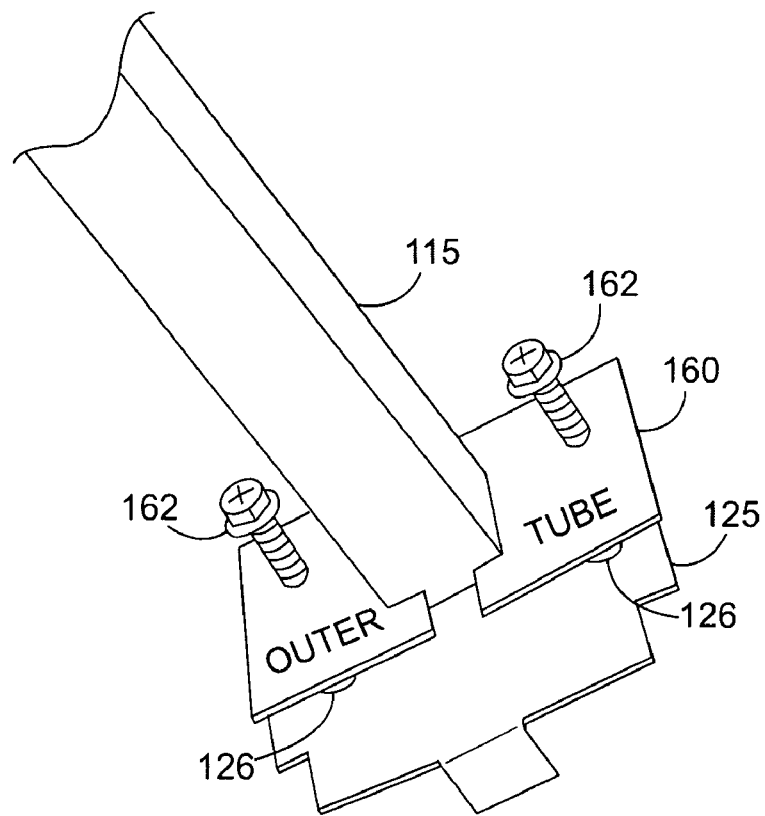
FIG. 8 is front elevation of the fastening device shown in FIGS. 2-4 installed on the assembly shown in FIG. 1.

FIG. 2 shows the electrical junction box 130 of FIG. 1 with the plastic cover 140 removed. The plastic cover 140 attaches to the electrical junction box 130 by the nubs 142 on the plastic cover 140 protruding through the openings 132 in the electrical junction box 130. The components of the fastening device of the present invention, including an inner member fastening device 150 and an outer member fastening device 160, are shown in a packaging configuration that includes the fastening devices 150, 160 inside the electrical junction box 130. In another embodiment, the inner member fastening device 150 and the outer member fastening device 160 are packaged in the installation position around the inner member 110 and the outer member 115, respectively of the tubular bar mechanism next to the end plates 120, 125. It should be understood that other embodiments of the packaging configuration exist that allow the fastening devices 150, 160 to accompany the electrical junction box 130. FIG. 3 illustrates that the mounting bracket assembly further includes the inner member fastening device 150 and the outer member fastening device 160. FIG. 4 illustrates that the inner member fastening device 150 and the outer member fastening device 160 each including two preset fasteners 152, 162, such as screws, nails, or the like, positioned to align with the openings 121, 126 in the end plates 120, 125. FIGS. 5 and 6 illustrate the inner member fastening device 150 positioned next to the end plate 120 attached to the inner member 110 of the telescoping tubular bar mechanism. When properly positioned, the preset fasteners 152 in the inner member fastening device 150 protrude partially through the openings 121 in the end plate 120 attached to the inner member 110 of the telescoping tubular bar mechanism. FIGS. 7 and 8 illustrate the outer member fastening device 160 positioned next to the end plate 125 attached to the outer member 115 of the telescoping tubular bar mechanism. When properly positioned, the preset fasteners 162 in the outer member fastening device 160 protrude partially through the openings 126 in the end plate 125 attached to the outer member 115 of the telescoping tubular bar mechanism.

An embodiment not shown in FIGS. 2-8, but contemplated in the present invention, is a star pattern cut around the openings for the preset fasteners 152 in the inner member fastening device 150 and the openings for the preset fasteners 162 in the outer member fastening device 160. If the star pattern is present, when the installer tightens the preset fasteners 152, 162, to attach the end-plates to the joist or beam, the star pattern opens and the installer can pull-out and discard the fastening devices 150, 160.

FIGS. 2-8 illustrate the inner member fastening device 150 and the outer member fastening device 160 each including two preset fasteners 152, 162. It should be understood that other embodiments of the packaging configuration exist that vary the number and configuration of the preset fasteners 152, 162. The material composition of the inner member fastening device 150 and the outer member fastening device 160 is such that the fastening device is semi-rigid to hold the preset fasteners in the correct installation position and flexible to allow the installer to position the device around the tubular bar mechanism, such as a plastic or other suitable material understood by one skilled in the art.

FIG. 9-14 illustrates an assembly for mounting an electrical fixture with an exemplary embodiment of a fastening device of the present invention.

Figure 9:
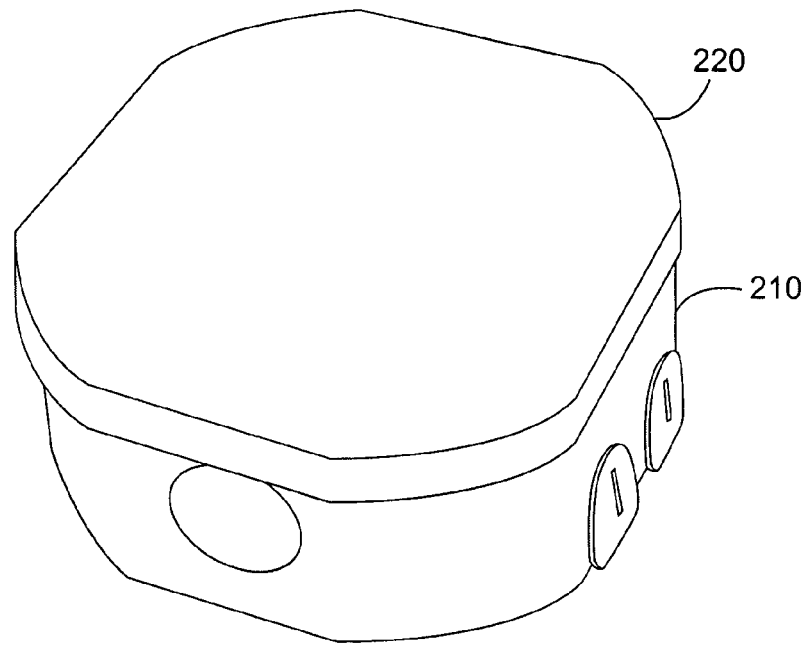
FIG. 9 is an isometric top-view of an assembly for mounting an electrical fixture with an exemplary embodiment of a fastening device of the present invention.
Figure 10:
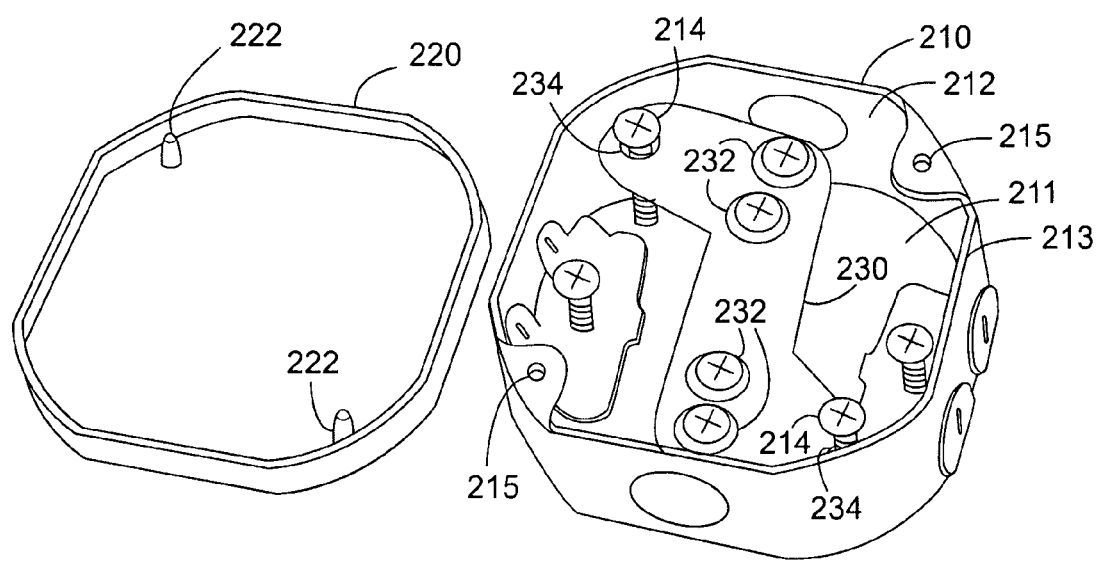
FIG. 10 is an exploded top-view of the assembly shown in FIG. 9.
Figure 11:
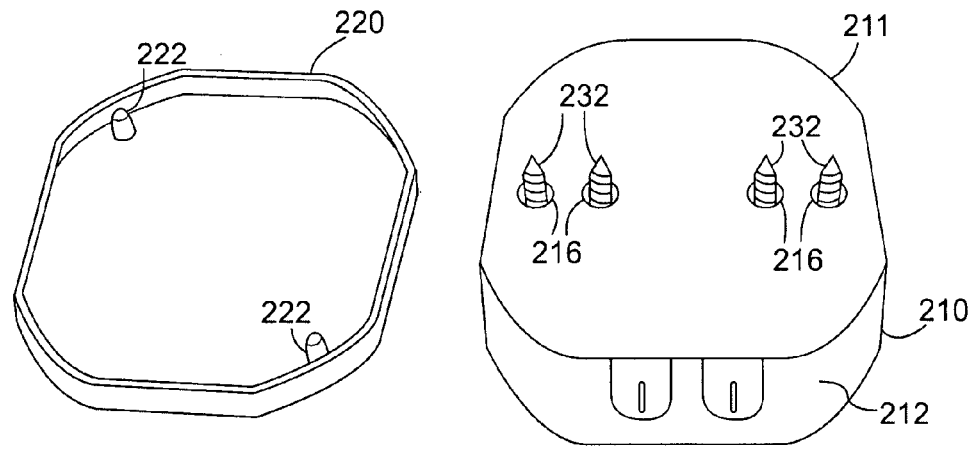
FIG. 11 is an exploded bottom-view of the assembly shown in FIG. 9.

As shown in FIG. 9, the electrical junction box 210 includes a generally square enclosure that contains the electrical wiring connections and a plastic cover 220 over the generally square enclosure. FIG. 10 illustrates the electrical junction box 210 with the plastic cover 220 removed to illustrate the electrical junction box 210 as including a top wall 211, annular side walls 212 integrally joined to the top wall 211 and terminating at the underside at a bottom plane 213, and the internal components. The internal components including two opposing threaded shoulder rivets 214 attached to the top wall 211 of the electrical junction box 210. These rivets 214 receive fasteners (not shown), such as screws, or the like, that support a relatively heavy load, such as a ceiling fan or light fixture, hanging from the electrical junction box 210. The components further include a fastening device 230 that includes four preset fasteners 232, such as screws, or the like, positioned to align with the openings 216 in the top wall 211. To ensure proper positioning, the fastening device 230 includes two openings 234 that utilize the rivets 214 as guides. The preset fasteners 232 secure the top wall 211 of the electrical junction box 210 to a joist or beam. FIG. 11 shows the preset fasteners 232 protruding through the holes 216 in the top wall 211 of the electrical junction box 210.

Figure 12:
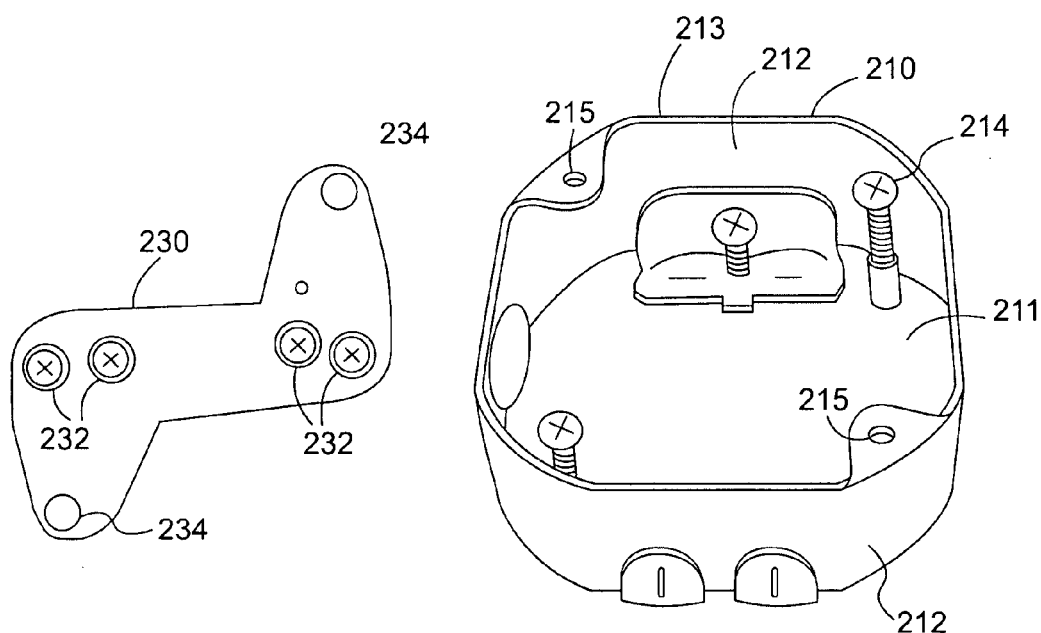
FIG. 12 is an exploded top-view of the assembly shown in FIG. 9.
Figure 13:
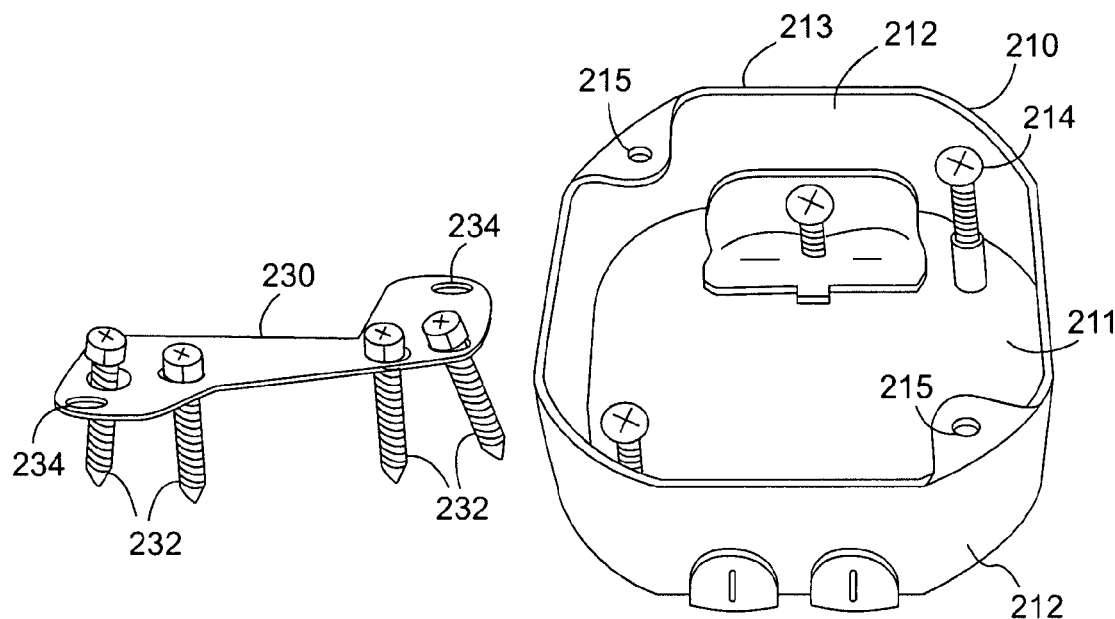
FIG. 13 is a side elevation of the assembly shown in FIG. 12.
Figure 14:
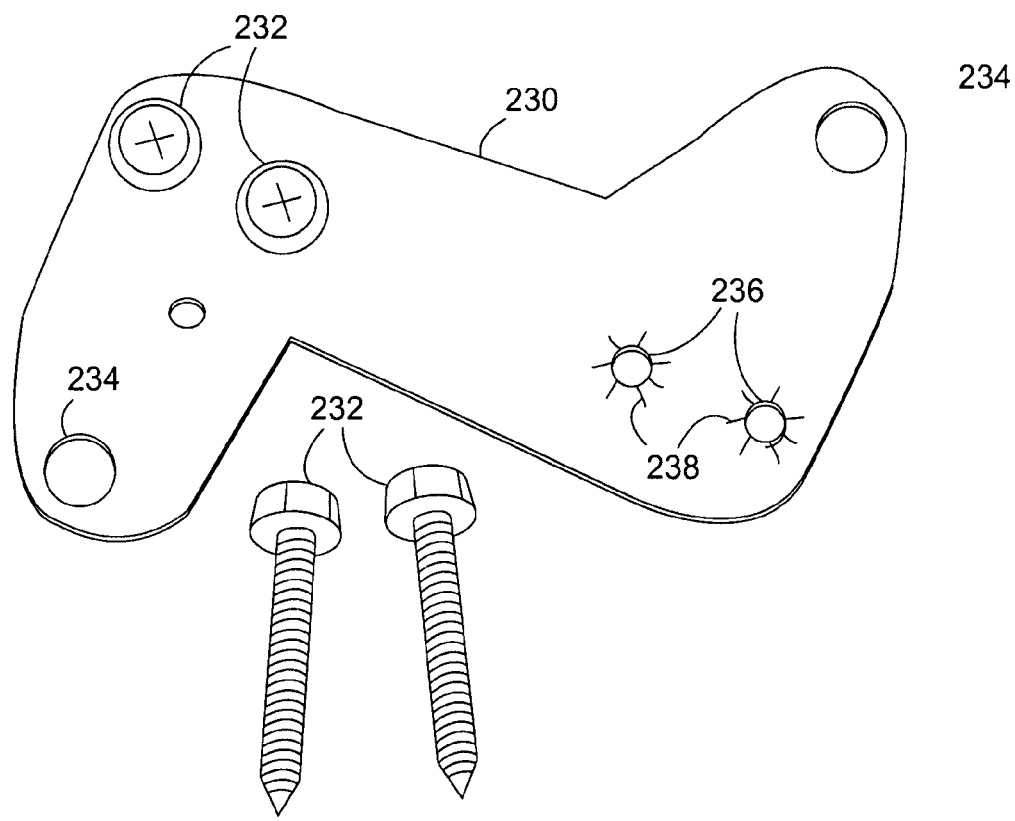
FIG. 14 is a top-view of the fastening device shown in FIG. 10.

FIG. 12 is a top view of the fastening device 230 with the preset fasteners 232 attached. FIG. 12 also shows the openings 234 in the fastening device 230 that wrap around the rivets 214 which functions as a guide for positioning the preset fasteners 232. FIG. 13 is a side view of the fastening device 230 with the preset fasteners 232 to show the fasteners 232 attached to the fastening device 230. FIG. 14 is another top view of the fastening device 230 to show the star pattern 238 cut around the opening 236 for each fastener 232 attached to the fastening device 230. When the installer tightens the preset fastener 232 to attach the electrical junction box 210 to the joist or beam, the star pattern 238 opens. When all of the preset fasteners 232 are completely tightened, the star pattern 238 opens around each preset fastener 232 and the installer can pull-out and discard the fastening device 230.

FIGS. 10-14 illustrate the fastening device 230 as having four preset fasteners 232. It should be understood that other embodiments of the packaging configuration exist that vary the number and configuration of the preset fasteners 232. FIGS. 10-14 also illustrate the fastening device 230 as including two openings 234 that utilize the two rivets 214 in the electrical junction box 210 as guides. It should be understood that other embodiments of the fastening device 230 exist that vary the number and configuration of the openings 234. FIGS. 10-14 also illustrate the electrical junction box 210, generally, as a square metal enclosure. It should be understood that other embodiments of the electrical junction box 210 exist that vary the shape of the electrical junction box 210, such as round, pancake, L-shaped, and the like. Furthermore, it should be understood that other embodiments of the electrical junction box 210 exist that vary the material composition of the electrical junction box 210, such as metal, plastic, and the like. The material composition of the fastening device 230 is such that the fastening device 230 is semi-rigid to hold the preset fasteners 232 in the correct installation position and flexible to allow the fastening device 230 to wrap around the rivets 214 and to allow the installer to pull-out and discard the fastening device 230, such as a plastic or other suitable material understood by one skilled in the art.

Although the disclosed exemplary embodiments describe a fully functioning fastening device for mounting an electrical fixture, the reader should understand that other equivalent exemplary embodiments exist. Since numerous modifications and variations will occur to those reviewing this disclosure, the fastening device for mounting an electrical fixture is not limited to the exact construction and operation illustrated and disclosed. Accordingly, this disclosure intends all suitable modifications and equivalents to fall within the scope of the claims.

I claim:

1. A fastening device for mounting an electrical fixture in a ceiling area, comprising:
    an electrical junction box;
    a support bar for spanning a distance between a pair of spaced joists, the support bar comprising:
        a pair of end-plates attached to the support bar, each end-plate having a surface plane that is substantially perpendicular to a lateral axis of the support bar, and including at least two openings for receiving fasteners,
        wherein a first end-plate is attached to a first end of the support bar, and a second end-plate is attached to a second end of the support bar;
    a clamp component for attaching the electrical junction box to the support bar; and
    a pair of overlays, each overlay associated with one of the pair of end-plates and comprising:
        an opening for receiving the support bar; and
        at least two fastener openings, each fastener opening for positioning a fastener that passes through one of said at least two openings in end-plate and attaches the end-plate to one of the spaced joists,
        wherein a first overlay is positioned along the support bar adjacent the first end-plate, and a second overlay is positioned along the support bar adjacent the second end-plate,
    wherein the electrical fixture is attached to the electrical junction box to mount the electrical fixture in the ceiling area.

2. The fastening device of claim 1, the support bar further comprising:
    an inner member; and
    an outer member,
        wherein the first end-plate is attached to one end of the inner member, the first end-plate having a surface plane that is substantially perpendicular to a lateral axis of the inner member, and the second end-plate is attached at one end of the outer member, the second end-plate having a surface plane that is substantially perpendicular to a lateral axis of the outer member,
        wherein an inside diameter of the outer member of the support bar is greater than an inside diameter of the inner member of the support bar, and
        wherein the outer member of the support bar receives the inner member of the support bar to allow the support bar to telescope along its lateral axis.

3. The fastening device of claim 1, wherein the pair of overlays are manufactured from a semi-rigid, flexible material, such as a plastic, or the like.

4. The fastening device of claim 1, wherein the electrical fixture is a ceiling fan, a light fixture, or the like.

5. The fastening device of claim 1, the overlay further comprising:
    a group of incisions surrounding each fastener opening, wherein the group of incisions allow the overlay to open around each fastener opening when an installer tightens the fastener positioned in each fastener opening.

6. The fastening device of claim 5, wherein each incision is cut in the overlay along a radius of the fastener opening.

7. The fastening device of claim 6, wherein the group of incisions form a star pattern around each fastener opening in the overlay.

8. The fastening device of claim 5, wherein tightening the fasteners positioned in said at least one fastener opening opens the overlay around said at least one fastener opening and allows the installer to remove the overlay associated with each end-plate.

9. A fastening device for mounting an electrical fixture in a ceiling area, comprising:
    an electrical junction box adapted to receive and support an electrical fixture;
    a support bar for spanning a distance between a pair of spaced joists, the support bar comprising a pair of end-plates attached to the support bar, each end-plate having a surface plane that is substantially perpendicular to a lateral axis of the support bar, and including at least two end plate openings for receiving fasteners, wherein a first end-plate is attached to a first end of the support bar, and a second end-plate is attached to a second end of the support bar; and
    at least one overlay associated with and positioned next to each end-plate, each overlay comprising at least two overlay fastener openings, each overlay fastener opening aligned with a respective end plate opening to position a fastener to pass through the respective end plate opening to attach the end-plate to one of the spaced joists.

10. The fastening device of claim 9, wherein each overlay fastener opening retains a preset fastener that extends through and partially protrudes from the respective end plate opening.

11. The fastening device of claim 9, wherein each overlay is manufactured from a semi-rigid, flexible material, such as a plastic, or the like.

12. The fastening device of claim 9, each overlay further comprises a group of incisions surrounding each overlay fastener opening, wherein the group of incisions allow the overlay to open around each overlay fastener opening when an installer tightens the preset fastener positioned in each overlay fastener opening.

13. The fastening device of claim 12, wherein each incision is cut in the overlay along a radius of the overlay fastener opening.

14. The fastening device of claim 12, wherein the group of incisions form a star pattern around each overlay fastener opening.

15. The fastening device of claim 14, wherein tightening the preset fasteners positioned in each overlay fastener opening opens the overlay around the present fastener and allows the installer to remove the overlay after installation.

* * * * *